United States Patent
Bobel et al.

(10) Patent No.: US 10,982,306 B2
(45) Date of Patent: Apr. 20, 2021

(54) ADDITIVE MANUFACTURING PROCESS AND POWDER MATERIAL THEREFOR

(71) Applicant: GM GLOBAL TECHNOLOGY OPERATIONS LLC, Detroit, MI (US)

(72) Inventors: Andrew C. Bobel, Clinton Township, MI (US); Anil K. Sachdev, Rochester Hills, MI (US); Tyson W. Brown, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 304 days.

(21) Appl. No.: 15/797,034

(22) Filed: Oct. 30, 2017

(65) Prior Publication Data

US 2019/0127828 A1 May 2, 2019

(51) Int. Cl.

| | |
|---|---|
| C22C 38/16 | (2006.01) |
| B22F 3/105 | (2006.01) |
| C22C 33/02 | (2006.01) |
| B33Y 10/00 | (2015.01) |
| B33Y 70/00 | (2020.01) |
| B23K 26/342 | (2014.01) |
| B22F 9/08 | (2006.01) |
| B23K 15/00 | (2006.01) |
| C21D 6/00 | (2006.01) |
| C22C 38/12 | (2006.01) |

(52) U.S. Cl.
CPC ............ *C22C 38/16* (2013.01); *B22F 3/1055* (2013.01); *B22F 9/082* (2013.01); *B23K 15/0086* (2013.01); *B23K 26/342* (2015.10); *B33Y 10/00* (2014.12); *B33Y 70/00* (2014.12); *C21D 6/00* (2013.01); *C22C 33/0264* (2013.01); *C22C 38/12* (2013.01); *B22F 2301/35* (2013.01); *B22F 2998/10* (2013.01); *C21D 2211/008* (2013.01); *C22C 33/0278* (2013.01)

(58) Field of Classification Search
CPC .......... C22C 38/16; C22C 38/42; B33Y 10/00
USPC ....................................................... 148/514
See application file for complete search history.

(56) References Cited

U.S. PATENT DOCUMENTS

| | | | |
|---|---|---|---|
| 3,899,368 A | * | 8/1975 | Waid .................. C22C 38/42 420/112 |
| 8,118,949 B2 | | 2/2012 | Sachdev et al. |
| 10,682,699 B2 | | 6/2020 | Martin et al. |
| 2019/0032175 A1 | | 1/2019 | Martin et al. |
| 2019/0040503 A1 | | 2/2019 | Martin et al. |

FOREIGN PATENT DOCUMENTS

| | | |
|---|---|---|
| CN | 1524649 A | 9/2004 |
| CN | 103785860 A | 5/2014 |
| CN | 105364065 A | 3/2016 |
| CN | 105478759 A | 4/2016 |
| CN | 105568113 A | 5/2016 |
| CN | 106735174 A | 5/2017 |

OTHER PUBLICATIONS

Benjamin L. Tiemans, et al.; Three-Dimensional (3-D) Atom Probe Tomography of a Cu-Precipitation-Strengthened Ultrahigh-Strength Carburized Steel; DOI: 10.1007/s11661-012-1178-5; The Minerals, Metals & Materials Society and ASM International 2012; Metallurgical and Materials Transactions A; vol. 43A, Oct. 2012; pp. 3626-3635.

Benjamin L. Tiemans, et al.; Cu-Precipitation Strengthening in Ultrahigh-Strength Carburizing Steels; DOI: 10.1007/s11661-012-1176-7; The Minerals, Metals & Materials Society and ASM International 2012; Metallurgical and Materials Transactions A; vol. 43A, Oct. 2012; pp. 3615-3625.

M.E. Fine, et al.; Origin of copper precipitation strengthening in steel revisited; Department of Materials Science and Engineering, Northwestern University, 2220 Campus Drive, Evanston, IL 60208-3108; USA; Scripta Materialia 53 (2005)115-118.

B. Mintz et al., Influence of small additions of copper and nickel on hot ductility of steels, Materials Science and Technology, May 1995, vol. 11, pp. 474-481.

Martin, et al., "3D Printing of High-Strength Aluminum Alloys", Nature, 549, 365-370, Sep. 21, 2017.

* cited by examiner

*Primary Examiner* — Weiping Zhu

(74) *Attorney, Agent, or Firm* — Quinn IP Law

(57) ABSTRACT

A powder material for an additive manufacturing process and a method of manufacturing a three-dimensional article via an additive manufacturing process. The powder material comprises an iron-based alloy including alloying elements of carbon (C) and copper (Cu). The iron-based alloy may be formulated to achieve a precipitation strengthened microstructure comprising a lath martensite matrix phase and a Cu precipitate phase. The iron-based alloy may have a Cu weight fraction and a nickel (Ni) weight fraction, and the Ni weight fraction may be less than the Cu weight fraction of the iron-based alloy.

20 Claims, No Drawings

ADDITIVE MANUFACTURING PROCESS AND POWDER MATERIAL THEREFOR

TECHNICAL FIELD

The present disclosure relates to a metal powder material for an additive manufacturing process and to a method of manufacturing a three-dimensional article using an additive manufacturing process wherein individual layers of the metal powder material are successively fused together.

INTRODUCTION

Additive manufacturing is a process for forming three-dimensional articles through successive fusion of select portions of powder layers consecutively deposited on a work surface. Such processes can be used to create metal articles having complex geometries without the use of tools or molds, and with little or no waste material. In practice, three-dimensional computer aided design (CAD) data of an article to be formed is digitally separated into two-dimensional cross-sections of the article. A layer of metal powder having a desired thickness is deposited on a work surface by spreading the metal powder over the work surface or by depositing the metal powder on select regions of the work surface in accordance with a first two-dimensional cross-section of the article. After the metal powder is deposited on the work surface, an energy beam scans the metal powder on the work surface in accordance with the first two-dimensional cross-section of the article such that the metal powder particles locally melt and fuse together to form a unitary solid cross-sectional slice of the article. Thereafter, another layer of metal powder is deposited on the work surface and scanned by the energy beam in accordance with another two-dimensional cross-section of the article. The powder deposition and energy beam scanning steps are repeated until the entire three-dimensional article is formed. Thereafter, the article may be subjected to various surface and/or heat treatments prior to or after being removed from the work surface.

A variety of metal alloy compositions and heat treatment processes have been developed for use in the manufacture of three-dimensional metal articles via casting and/or hot forming operations to impart certain desirable chemical and mechanical properties to the articles. However, there is a need in the art for metal alloy compositions and heat treatment processes that can be employed in additive manufacturing processes to form three-dimensional articles having certain desirable chemical and mechanical properties.

SUMMARY

A powder material for an additive manufacturing process may comprise particles of an iron-based alloy. The iron-based alloy may include alloying elements of carbon (C) and copper (Cu) and may be formulated to achieve a precipitation strengthened microstructure comprising a lath martensite matrix phase and a Cu precipitate phase. The iron-based alloy may have a Cu weight fraction and a nickel (Ni) weight fraction, and the Ni weight fraction may be less than the Cu weight fraction of the iron-based alloy. The iron-based alloy may not exhibit hot shortness when a volume of the iron-based alloy is melted and cooled at a cooling rate of greater than or equal to $10^4$ degrees Celsius per second.

The iron-based alloy may comprise, by weight, between 0-0.6% carbon and 0.1-10% copper.

The iron-based alloy may have a cobalt (Co) weight fraction. In one form, the Ni weight fraction and the Co weight fraction of the iron-based alloy each may be less than half the Cu weight fraction of the iron-based alloy. In another form, the iron-based alloy may be essentially free of nickel and cobalt.

The iron-based alloy may comprise at least one carbide former selected from the group consisting of molybdenum (Mo), vanadium (V), chromium (Cr), and combinations thereof. In such case, the iron-based alloy may be formulated to achieve a precipitation strengthened microstructure comprising a lath martensite matrix phase, a Cu precipitate phase, and an $M_2C$ carbide precipitate phase, wherein M is Mo, V, Cr, or a combination thereof.

An atomic ratio of the at least one carbide former to carbon in the iron-based alloy may be 2:1.

In one form, the iron-based alloy may comprise, by weight, 0.015-0.5% C, 2.0-5.0% Cu, 0.5-3.0% Mo, 0.1-0.2% V, 0-3.0% Cr, 0-0.4% Si, and iron as balance.

The particles of the iron-based alloy may have a mean particle diameter in the range of 5-100 μm.

In a method of manufacturing a three-dimensional article via an additive manufacturing process, an iron-based alloy may be provided in powder form. The iron-based alloy may comprise alloying elements of carbon (C) and copper (Cu) and may have a Cu weight fraction and a nickel (Ni) weight fraction less than the Cu weight fraction. A layer of particles of the iron-based alloy may be deposited on a work surface and an energy beam may be directed at the layer of particles on the work surface to fuse at least a portion of the particles together into a unitary solid mass. Layers of particles of the iron-based alloy may be repeatedly and sequentially deposited and fused together on the work surface to build up a one-piece three-dimensional article.

The iron-based alloy may comprise, by weight, between 0-0.6% carbon and 0.1-10% copper.

In one form, the iron-based alloy may be essentially free of nickel and cobalt.

In one form, an energy beam may be directed at a select region of the layer of particles on the work surface to locally melt and fuse the particles together. The energy beam may be advanced along a predetermined path on the work surface such that a volume of molten iron-based alloy material rapidly cools and solidifies behind the advancing energy beam to form a unitary solid mass. The volume of molten iron-based alloy material may cool and solidify behind the advancing energy beam at a cooling rate of greater than or equal to $10^4$ degrees Celsius per second.

The three-dimensional article may be heat treated by heating the article to a temperature in the range of 450-600 degrees Celsius for 0.5-12 hours to achieve a precipitation strengthened microstructure within the article that includes a lath martensite matrix phase and a Cu precipitate phase. The Cu precipitate phase may comprise particles of a copper-based material dispersed within the lath martensite matrix phase. The particles of the copper-based material may have a mean particle diameter in the range of 1-100 nanometers.

In one form, the iron-based alloy may comprise at least one carbide former selected from the group consisting of molybdenum (Mo), vanadium (V), chromium (Cr), and combinations thereof. In such case, the three-dimensional article may be heat treated by heating the article to a temperature in the range of 450-600 degrees Celsius for 0.5-48 hours to achieve a precipitation strengthened microstructure within the article that includes a lath martensite matrix phase, a Cu precipitate phase, and an $M_2C$ carbide precipitate phase, wherein M is Mo, V, Cr, or a combination thereof. The $M_2C$ carbide precipitate phase may comprise particles of an $M_2C$ carbide, wherein M is Mo, V, Cr, or a combination thereof. The $M_2C$ carbide particles may have a mean particle diameter in the range of 1-100 nanometers.

In one form, prior to heat treating the article, the three-dimensional article may be heated to a temperature in the range of 1000-1250 degrees Celsius for 1-12 hours.

In one form, the iron-based alloy may comprise, by weight, 0.015-0.5% C, 2.0-5.0% Cu, 0.5-3.0% Mo, 0.1-0.2% V, 0-3.0% Cr, 0-0.4% Si, and iron as balance.

Particles of the iron-based alloy may be formed by melting a volume of material including all constituents of the iron-based alloy in corresponding amounts to produce a volume of molten iron-based alloy material. The volume of molten iron-based alloy material may be atomized to produce droplets of molten iron-based alloy material. The droplets may be cooled to ambient temperature to form solid particles of the iron-based alloy.

DETAILED DESCRIPTION

The presently disclosed iron-based alloy can be formed into a powder and used as a building material in an additive manufacturing process to build up a three-dimensional article layer by layer. The iron-based alloy is formulated to achieve a precipitation strengthened microstructure having high mechanical strength and fracture toughness when subjected to a suitable heat treatment. In addition, the iron-based alloy does not exhibit hot shortness when relatively small volumes of the alloy are melted and rapidly cooled to a solid state, such as during an additive manufacturing process.

As used herein, the term "iron-based alloy" refers to a material that comprises, by weight, greater than or equal to 80%, preferably greater than or equal to 90%, or more preferably greater than or equal to 93% iron (Fe) and one or more other elements selected to impart certain desirable properties to the material that are not exhibited by pure iron.

An iron-based alloy including alloying elements of carbon (C) and copper (Cu) may be prepared in the form of a powder and used as a building material in an additive manufacturing process. Such an alloy may be referred to herein as an Fe—C—Cu alloy. The Fe—C—Cu alloy may include, by weight, greater than or equal to 0%, 0.015%, or 0.05% carbon; less than or equal to 0.6%, 0.5%, or 0.2% carbon; or between 0-0.6%, 0.015-0.5%, or 0.05-0.2% carbon. In addition, the Fe—C—Cu alloy may include, by weight, greater than or equal to 0.1%, 2.0%, or 3.0% copper; less than or equal to 10%, 5.0%, or 4.0% copper; or between 0.1-10%, 2.0-5.0%, or 3.0-4.0% copper. In one form, the Fe—C—Cu alloy may include, by weight, 1-4% copper. In one specific example, the Fe—C—Cu alloy may comprise or consist of, by weight, 0-0.6% carbon, 0.1-10% copper, and iron as balance. The term "as balance" does not exclude the presence of additional elements not intentionally introduced into the composition of the Fe—C—Cu alloy but nonetheless inherently present in the alloy in relatively small amounts, e.g., as impurities.

The Fe—C—Cu alloy optionally may include one or more carbide-forming elements. For example, the Fe—C—Cu alloy optionally may include one or more of molybdenum (Mo), vanadium (V), and chromium (Cr). When included in the composition of the Fe—C—Cu alloy, such elements may form $M_2C$ carbides, where M comprises at least one of Mo, V, and Cr. In such case, the atomic fraction of Mo, V, and Cr in the Fe—C—Cu alloy may be twice the atomic fraction of carbon in the Fe—C—Cu alloy. In some embodiments, the Fe—C—Cu alloy may include, by weight, greater than or equal to 0%, 0.4%, or 0.5% molybdenum; less than or equal to 4.0%, 3.0%, or 1.5% molybdenum; or between 0-4.0%, 0.4-3.0%, or 0.5-1.5% molybdenum. Additionally or alternatively, the Fe—C—Cu alloy may include, by weight, greater than or equal to 0%, 0.1%, or 0.15% vanadium; less than or equal to 0.5% or 0.2% vanadium; or between 0-0.5%, 0.1-0.2%, or 0.15-0.2% vanadium. Additionally or alternatively, the Fe—C—Cu alloy may include, by weight, greater than or equal to 0%, 0.4%, or 0.5% chromium; less than or equal to 4.0%, 3.0%, or 1.5% chromium; or between 0-4.0%, 0.4-3.0%, or 0.5-1.5% chromium.

In some embodiments, the Fe—C—Cu alloy also may include silicon (Si) to provide the alloy with suitable oxidation resistance. In such case, the Fe—C—Cu alloy may include, by weight, greater than or equal to 0%, 0.1%, or 0.2% silicon; less than or equal to 1.0%, 0.5%, or 0.3% silicon; or between 0-1.0%, 0.1-0.5%, or 0.2-0.3% silicon. In one specific example, the Fe—C—Cu alloy may comprise or consist of, by weight, 0.015-0.5% C, 2.0-5.0% Cu, 0.5-3.0% Mo, 0.1-0.2% V, 0-3.0% Cr, 0-0.4% Si, and iron as balance.

The total amount of alloying elements (e.g., C, Cu, Mo, V, Cr, Si, and combinations thereof) may comprise, by weight, less than 20% of the Fe—C—Cu alloy.

Additional elements not intentionally introduced into the composition of the Fe—C—Cu alloy nonetheless may be inherently present in the alloy in relatively small amounts, for example, less than 0.2%, preferably less than 0.05%, and more preferably less than 0.01% by weight of the Fe—C—Cu alloy. Such elements may be present, for example, as impurities in the raw materials used to prepare the Fe—C—Cu alloy composition.

Nickel has previously been added to copper-containing iron-based alloys in amounts equal to or greater than the amount of copper present in the alloy to prevent a phenomenon known as "hot shortness," wherein a relatively low melting point liquid copper-rich phase forms and penetrates into the grain boundaries within the iron matrix at elevated temperatures (e.g., during continuous casting and hot forming operations), leading to the formation of intergranular cracks. Without intending to be bound by theory, it is believed that the addition of nickel increases the solubility of copper in the iron-based alloy and increases the melting point of the copper-rich phase, thereby suppressing the formation of a liquid copper-rich phase along the grain boundaries and thus the formation of cracks. However, the inclusion of nickel in a copper-containing iron-based alloy increases the cost of the alloy and also lowers the martensite start ($M_S$) temperature of the alloy, which inhibits the formation of a lath martensite microstructure. It may be desirable to achieve a lath martensite microstructure in an iron-based alloy, instead of a plate-like microstructure, for example, in situations where high fracture toughness is desired. Therefore, it is common practice to add cobalt (Co) to iron-based alloys in combination with nickel to counter the effects of the nickel on the $M_S$ temperature of the alloy. The specific amount of cobalt included in the iron-based alloy may depend upon the desired $M_S$ temperature of the alloy. In one form, cobalt may be added to an iron-based alloy in combination with nickel in an amount equal to or greater than the amount of nickel in the alloy.

When the Fe—C—Cu alloy is formed into a powder and used as a building material in an additive manufacturing process to form a three-dimensional article, the Fe—C—Cu alloy does not require the addition of nickel to prevent or suppress hot shortness during the formation and subsequent heat treatment of the three-dimensional article. In turn, the Fe—C—Cu alloy does not require the addition of cobalt to counter the negative side effects of nickel on the $M_S$ temperature of the alloy. As such, the Fe—C—Cu alloy may be essentially free of nickel (Ni) and/or cobalt (Co) or may comprise relatively small amounts of Ni and/or Co, as compared the amounts of Ni and/or Co typically present in iron-based alloys that are formulated for use in continuous casting or hot forming operations, e.g., hot rolling. For example, in one form, the Fe—C—Cu alloy may be essentially free of nickel (Ni) and may comprise, by weight, less than 0.2%, preferably less than 0.05%, and more preferably less than 0.01% Ni. In addition, the Fe—C—Cu alloy may be essentially free of cobalt (Co) and may comprise, by weight, less than 0.2%, preferably less than 0.05%, and more preferably less than 0.01% Co. In another form, the Fe—C—Cu alloy may comprise relatively small amounts of Ni and/or Co. For example, the weight fraction of Ni and the weight fraction of Co in the Fe—C—Cu alloy individually may be less than the weight fraction of Cu in the iron-based alloy. In one specific example, the weight fraction of Ni and the weight fraction of Co in the Fe—C—Cu alloy individually may be less than one-half the weight fraction of Cu in the Fe—C—Cu alloy.

Without intending to be bound by theory, it is believed that the addition of nickel to the Fe—C—Cu alloy is not required to prevent or suppress hot shortness when the Fe—C—Cu alloy is used as a building material in an additive manufacturing processes due to the relatively high cooling rates typically experienced in additive manufacturing processes. More specifically, it is believed that, when the Fe—C—Cu alloy is cooled at the relatively high cooling rates typically experienced in additive manufacturing processes, there is insufficient time for the copper to diffuse from solid solution and concentrate along the grain boundaries within the iron matrix, thereby inhibiting the intergranular cracking typically associated with hot shortness. For example, in a typical additive manufacturing process, an energy beam is used to sequentially melt relatively small volumes of building material on the order of about 0.001 cubic millimeters or less. Thereafter, these relatively small volumes of molten building material are rapidly quenched and re-solidified at a cooling rate of equal to or greater than $10^6$ degrees Celsius per second. On the other hand, the volume of an as-cast steel billet may be about $2 \times 10^8$ cubic millimeters or more and may be solidified at a relatively slow cooling rate in the range of 10 degrees Celsius per second to $10^3$ degrees Celsius per second.

A three-dimensional article comprising the Fe—C—Cu alloy and formed via an additive manufacturing process may initially exhibit a homogenous microstructure including fine-grains of lath martensite. However, the Fe—C—Cu alloy is formulated to achieve a precipitation strengthened microstructure having high mechanical strength and fracture toughness when subjected to a tempering heat treatment. More specifically, the Fe—C—Cu alloy is formulated to achieve a fine-grained microstructure including a lath martensite matrix phase and a copper precipitate phase when subjected to a tempering heat treatment. A suitable tempering heat treatment may involve heating the Fe—C—Cu alloy to a temperature in the range of 450° C. to 600° C. for 0.5 hours to 12 hours to affect the formation of a copper precipitate phase by the heterogeneous precipitation of coherent nanoscale copper-based particles along dislocations and along grain boundaries within the lath martensite microstructure. The as-formed copper-based particles may be spherical in shape and may have a mean particle diameter in the range of 1-100 nm. In one form, the copper-based particles may have a mean particle diameter of less than 3 nm. After formation of the copper precipitate phase, the Fe—C—Cu alloy may exhibit a tensile strength in the range of 800 MPa to 1500 MPa at ambient temperature.

As used herein, the term "copper-based" broadly refers to materials in which copper is the single largest constituent of the material by weight. For example, a copper-based material may include greater than 50 wt. % copper, or a copper-based material may comprise less than 50 wt. % copper so long as copper is the single largest constituent of the material by weight. In one form, a copper-based material may comprise 100 wt. % copper.

In embodiments where the Fe—C—Cu alloy includes one or more carbide forming elements (e.g., Mo, V, and/or Cr), a three-dimensional article comprising the Fe—C—Cu alloy and formed via an additive manufacturing process may initially exhibit a homogenous microstructure including fine grains of lath martensite. However, the Fe—C—Cu alloy may be formulated to achieve a microstructure that includes a lath martensite matrix phase, a copper precipitate phase, and an $M_2C$ carbide precipitate phase when subjected to a tempering heat treatment. A suitable tempering heat treatment may include heating the Fe—C—Cu alloy to a temperature in the range of 450° C. to 600° C. for 0.5 hours to 48 hours to affect the formation of the copper precipitate phase and the $M_2C$ carbide precipitate phase within the lath martensite matrix phase. The copper precipitate phase may comprise nanoscale particles of a copper-based material and the $M_2C$ carbide precipitate phase may comprise nanoscale $M_2C$ carbide particles. The copper precipitate phase and the $M_2C$ carbide precipitate phase may be heterogeneously distributed along dislocations and along grain boundaries within the lath martensite matrix phase. After formation of the copper precipitate phase and the $M_2C$ carbide precipitate phase, the Fe—C—Cu alloy may exhibit a tensile strength in the range of 2000 MPa to 3000 MPa at ambient temperature.

In prior Fe—C—Cu alloys that include nickel and cobalt to prevent hot shortness and/or to achieve a desired $M_S$ temperature, as well as one or more carbide forming elements, the presence of cobalt in the Fe—C—Cu alloys may enhance carbide nucleation during tempering. However, when the presently disclosed Fe—C—Cu alloy is formed into a powder and used as a building material in an additive manufacturing process to form a three-dimensional article, the Fe—C—Cu alloy does not require the addition of cobalt for the effective nucleation of nanoscale $M_2C$ carbide particles within the lath martensite matrix phase during tempering. Without intending to be bound by theory, it is believed that, in the absence of cobalt or in the presence of relatively small amounts of cobalt, the Cu-based precipitates may catalyze the formation of an $M_2C$ carbide precipitate phase within the lath martensite matrix phase during tempering by providing nucleation sites for nanoscale $M_2C$ carbide particles to form within the lath martensite matrix phase.

After the Fe—C—Cu alloy is subjected to the tempering heat treatment, the alloy may be gradually cooled down to ambient temperature (e.g., 25° C.).

In some embodiments, the Fe—C—Cu alloy may be subjected to a solution heat treatment prior to initiating the tempering heat treatment. The solution heat treatment may be performed to dissolve into solid solution any precipitate phases that may have segregated and formed along grain boundaries in the lath martensite microstructure during a preceding process step. For example, the solution heat treatment may be performed on a three-dimensional article after the article is formed from the Fe—C—Cu alloy using an additive manufacturing process, but before the article is subjected to the tempering heat treatment. A suitable solution heat treatment may include heating the Fe—C—Cu alloy at a temperature in the range of 1000° C. to 1250° C. for 1-12 hours. Thereafter, the Fe—C—Cu alloy is preferably quenched or cooled at a relatively fast cooling rate to prevent or minimize the formation of a precipitate phase along grain boundaries in the lath martensite microstructure. Suitable cooling rates may be achieved by quenching the Fe—C—Cu alloy in water, oil, or a suitable quench gas.

The solution heat treatment may be omitted, for example, in embodiments where prior processing steps have not resulted in segregation and/or the formation of precipitate phases along grain boundaries in the lath martensite microstructure of the Fe—C—Cu alloy.

The Fe—C—Cu alloy may be prepared for use in an additive manufacturing process by forming the Fe—C—Cu alloy into a powder material. Suitable powder materials for use in additive manufacturing processes may comprise spherical particles of the Fe—C—Cu alloy having a mean particle diameter in the range of 5 μm to 100 μm. In one form, the Fe—C—Cu alloy may be formed into such a powder using an atomization process. In an atomization process, a volume of material including all constituents of the Fe—C—Cu alloy in corresponding amounts may be melted to produce a volume of molten Fe—C—Cu alloy material. The molten Fe—C—Cu alloy material may have a temperature in the range of 1500-1700° C. and may be sprayed through a nozzle with the aid of a high-pressure gas or liquid to form tiny droplets of the molten Fe—C—Cu alloy. The molten Fe—C—Cu alloy droplets may be rapidly quenched by contact with a cooling medium, e.g., water, a mix of water and alcohol, or a protective gas, to form solid powder particles of the Fe—C—Cu alloy exhibiting a desired size and shape.

The Fe—C—Cu alloy particles may be used as a building material in an additive manufacturing process to form a three-dimensional article by building up the article layer by layer. In one form, each of the Fe—C—Cu alloy particles may have the same chemical composition. As such, the Fe—C—Cu alloy particles may be distinguished from other powder materials used in additive manufacturing processes that include a mixture of particles, with some of the particles in the mixture having a different chemical composition than other particles.

Suitable additive manufacturing processes will induce fusion of the Fe—C—Cu alloy particles by exposing the particles to an energy beam (e.g., a high-power laser or electron beam) such that the particles fuse together into a unitary solid mass: without melting (e.g., solid state sintering), with partial melting (e.g., liquid phase sintering), by fully melting and fusing together in the liquid phase, or by application of a binder to the particles (e.g., indirect fusion and binder jetting). Full melting of the Fe—C—Cu alloy particles into molten Fe—C—Cu alloy material may be performed at a temperature in the range of 1500-1700° C.

In one form, the Fe—C—Cu alloy powder may be used to form a three-dimensional article via a powder bed fusion process. In such case, a layer of Fe—C—Cu alloy particles having a desired thickness may be spread out over a work surface. Then, a high-power energy beam (e.g., a laser beam or electron beam) may be directed at the particles on the work surface and advanced along a computer controlled path to locally melt and fuse the particles together along the path. The computer controlled path may correspond to a two-dimensional cross-section or slice of the article to be formed and may be based upon three-dimensional computer aided design (CAD) data of the article. As the energy beam advances along the path, a volume of molten Fe—C—Cu alloy material rapidly solidifies in the wake of the energy beam, leaving behind a unitary solid mass of re-solidified Fe—C—Cu alloy material. A volume of molten Fe—C—Cu alloy material may rapidly solidify in the wake of the energy beam at a cooling rate of greater than or equal to $10^4$ degrees Celsius per second. In some specific examples, the volume of molten Fe—C—Cu alloy material may rapidly solidify in the wake of the energy beam at cooling rates of greater than or equal to $10^5$ degrees Celsius per second or greater than or equal to $10^6$ degrees Celsius per second. Thereafter, the work surface may be lowered to a depth equal to the height of the next particle layer and another layer of Fe—C—Cu alloy particles may be spread out over the work surface and over the re-solidified Fe—C—Cu alloy material on the work surface. The energy beam may again be directed at the newly deposited particles on the work surface and advanced along a computer controlled path to locally melt and fuse the particles together along the path. As the newly deposited particles melt and fuse to one another, select regions of the molten Fe—C—Cu alloy material also may fuse to the previously formed layer of re-solidified Fe—C—Cu alloy material to form a unitary solid mass. Consecutive layers of Fe—C—Cu alloy particles may be deposited on the work surface and successively fused together until the entire three-dimensional article is formed.

In another form, the Fe—C—Cu alloy powder may be used to form a three-dimensional article via a directed energy deposition process. In such case, particles of the Fe—C—Cu alloy may be supplied to a nozzle and deposited by the nozzle onto a work surface in the form of a layer having a desired thickness. The Fe—C—Cu alloy particles may be deposited on the work surface only in areas where the particles are needed to form a two-dimensional cross-section or slice of the article to be formed. Then, an energy beam (e.g., a laser beam or electron beam) may be immediately directed at the Fe—C—Cu alloy particles on the work surface to locally melt and fuse the particles together. As the energy beam scans the Fe—C—Cu alloy particles on the work surface, a volume of molten Fe—C—Cu alloy material rapidly solidifies in the wake of the energy beam, leaving behind a unitary solid mass of re-solidified Fe—C—Cu alloy material. For example, the volume of molten Fe—C—Cu alloy material may rapidly solidify in the wake of the energy beam at a cooling rate of greater than or equal to $10^4$ degrees Celsius per second. In some specific examples, the volume of molten Fe—C—Cu alloy material may rapidly solidify in the wake of the energy beam at cooling rates of greater than or equal to $10^5$ degrees Celsius per second or greater than or equal to $10^6$ degrees Celsius per second. Subsequent layers of the Fe—C—Cu alloy particles may be deposited, melted, and re-solidified on the work surface until the entire three-dimensional article is formed.

The Fe—C—Cu alloy powder may be used in the additive manufacturing processes described above—or in any other suitable additive manufacturing process—to form a three-dimensional article therefrom. Thereafter, the three-dimensional article may be subjected to the tempering heat treatment described herein or to both the solution heat treatment and the tempering heat treatment to achieve a precipitation strengthened microstructure within the three-dimensional article including a lath martensite matrix phase, a copper precipitate phase, and optionally an $M_2C$ carbide precipitate phase.

The above description of preferred exemplary embodiments, aspects, and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A powder material for an additive manufacturing process, the powder material comprising:
    particles of an iron-based alloy including alloying elements of carbon (C) and copper (Cu),
    wherein the iron-based alloy is formulated to achieve a precipitation strengthened microstructure comprising a lath martensite matrix phase and a Cu precipitate phase,
    wherein the iron-based alloy has a Cu weight fraction and a nickel (Ni) weight fraction, and the Ni weight fraction is less than the Cu weight fraction of the iron-based alloy,
    wherein the iron-based alloy comprises, by weight, 2.0-5.0% copper,
    wherein the iron-based alloy does not exhibit hot shortness when a volume of the iron-based alloy is melted and cooled at a cooling rate of greater than or equal to $10^4$ degrees Celsius per second, and
    wherein the iron-based alloy comprises, by weight, less than 0.2% nickel.

2. The powder material set forth in claim 1 wherein the iron-based alloy comprises, by weight, between 0-0.6% carbon.

3. The powder material set forth in claim 1 wherein the iron-based alloy has a cobalt (Co) weight fraction, and wherein the Ni weight fraction and the Co weight fraction of the iron-based alloy are each less than half the Cu weight fraction of the iron-based alloy.

4. The powder material set forth in claim 1 wherein the iron-based alloy is essentially free of nickel and cobalt, and wherein the iron-based alloy comprises, by weight, less than 0.05% nickel and less than 0.05% cobalt.

5. The powder material set forth in claim 1 wherein the iron-based alloy comprises at least one carbide former selected from the group consisting of molybdenum (Mo), vanadium (V), chromium (Cr), and combinations thereof, and wherein the iron-based alloy is formulated to achieve a precipitation strengthened microstructure comprising a lath martensite matrix phase, a Cu precipitate phase, and an $M_2C$ carbide precipitate phase, wherein M is Mo, V, Cr, or a combination thereof.

6. The powder material set forth in claim 5 wherein an atomic ratio of the at least one carbide former to carbon in the iron-based alloy is 2:1.

7. The powder material set forth in claim 1 wherein the iron-based alloy comprises, by weight, 0.015-0.5% C, 0.5-3.0% Mo, 0.1-0.2% V, 0-3.0% Cr, 0-0.4% Si, and iron as balance.

8. The powder material set forth in claim 1 wherein the particles of the iron-based alloy have a mean particle diameter in the range of 5-100 µm.

9. The powder material set forth in claim 1 wherein the iron-based alloy is essentially free of nickel and cobalt, and wherein the iron-based alloy comprises, by weight, less than 0.01% nickel and less than 0.01% cobalt.

10. A method of manufacturing a three-dimensional article via an additive manufacturing process, the method comprising:
    (a) providing an iron-based alloy in powder form, the iron-based alloy comprising alloying elements of carbon (C) and copper (Cu) and having a Cu weight fraction and a nickel (Ni) weight fraction less than the Cu weight fraction;
    (b) depositing a layer of particles of the iron-based alloy on a work surface;
    (c) directing an energy beam at the layer of particles on the work surface to fuse at least a portion of the particles together into a unitary solid mass; and
    (d) repeatedly and sequentially depositing and fusing layers of particles of the iron-based alloy together on the work surface to build up a one-piece three-dimensional article,
    wherein the iron-based alloy comprises, by weight, 2.0-5.0% copper, and
    wherein the iron-based alloy comprises, by weight, less than 0.2% nickel.

11. The powder material set forth in claim 10 wherein the iron-based alloy comprises, by weight, between 0-0.6% carbon.

12. The method of claim 10 wherein the iron-based alloy is essentially free of nickel and cobalt, and wherein the iron-based alloy comprises, by weight, less than 0.05% nickel and less than 0.05% cobalt.

13. The method of claim 10 wherein said step (c) comprises directing an energy beam at a select region of the layer of particles on the work surface to locally melt and fuse the particles together, and advancing the energy beam along a predetermined path on the work surface such that a volume of molten iron-based alloy material rapidly cools and solidifies behind the advancing energy beam to form a unitary solid mass, and wherein the volume of molten iron-based alloy material cools and solidifies behind the advancing energy beam at a cooling rate of greater than or equal to $10^4$ degrees Celsius per second.

14. The method of claim 10 further comprising:
    (e) heat treating the three-dimensional article by heating the article to a temperature in the range of 450-600 degrees Celsius for 0.5-12 hours to achieve a precipitation strengthened microstructure within the article that includes a lath martensite matrix phase and a Cu precipitate phase.

15. The method of claim 14 wherein the Cu precipitate phase comprises particles of a copper-based material dispersed within the lath martensite matrix phase, and wherein the particles of the copper-based material have a mean particle diameter in the range of 1-100 nanometers.

16. The method of claim 14 wherein the iron-based alloy comprises at least one carbide former selected from the group consisting of molybdenum (Mo), vanadium (V), chromium (Cr), and combinations thereof, and wherein the three-dimensional article is heated in step (e) to a temperature in the range of 450-600 degrees Celsius for 0.5-48 hours to achieve a precipitation strengthened microstructure within the article that includes a lath martensite matrix phase, a Cu precipitate phase, and an $M_2C$ carbide precipitate phase, wherein M is Mo, V, Cr, or a combination thereof.

17. The method of claim 16 wherein the $M_2C$ carbide precipitate phase comprises particles of an $M_2C$ carbide, wherein M is Mo, V, Cr, or a combination thereof, and wherein the $M_2C$ carbide particles having a mean particle diameter in the range of 1-100 nanometers.

18. The method of claim 14 comprising:
prior to step (e), heating the three-dimensional article to a temperature in the range of 1000-1250 degrees Celsius for 1-12 hours.

19. The method of claim 10 wherein the iron-based alloy comprises, by weight, 0.015-0.5% C, 0.5-3.0% Mo, 0.1-0.2% V, 0-3.0% Cr, 0-0.4% Si, and iron as balance.

20. The method of claim 10 wherein providing the iron-based alloy in powder form comprises melting a volume of material including all constituents of the iron-based alloy in corresponding amounts to produce a volume of molten iron-based alloy material, atomizing the volume of molten iron-based alloy material to produce droplets of molten iron-based alloy material, and then cooling the droplets to ambient temperature to form solid particles of the iron-based alloy.

* * * * *